US006658307B1

(12) United States Patent
Mueller

(10) Patent No.: US 6,658,307 B1
(45) Date of Patent: Dec. 2, 2003

(54) METHOD FOR CONFIGURING THE FUNCTIONAL PROPERTIES OF AN AUDIOLOGICAL DEVICE

(75) Inventor: Stefan Mueller, Erlangen (DE)

(73) Assignee: Siemens Aktiengesellschaft, Münich (DE)

( * ) Notice: Subject to any disclaimer, the term of this patent is extended or adjusted under 35 U.S.C. 154(b) by 386 days.

(21) Appl. No.: 09/686,888

(22) Filed: Oct. 12, 2000

(30) Foreign Application Priority Data

Oct. 14, 1999 (DE) ........................................ 199 49 604

(51) Int. Cl.[7] ................................................ G05B 19/42

(52) U.S. Cl. ............................ 700/87; 700/18; 700/86; 700/36; 700/27; 700/7; 700/94; 704/3; 704/7; 704/272; 704/278; 381/23.1; 381/321; 381/330; 381/312; 705/51; 705/52; 705/53; 705/54

(58) Field of Search ............................. 700/1, 7, 8, 10, 700/11, 12, 18, 27, 86, 87, 88, 94, 36; 381/321, 330, 320, 68, 68.2, 68.4, 102, 106, 312, 23.1; 704/3, 7, 272, 278; 705/51, 52, 53, 54

(56) References Cited

U.S. PATENT DOCUMENTS 5,848,171 A * 12/1998 Stockham et al. .......... 381/321
6,311,155 B1 * 10/2001 Vaudrey et al. ............. 704/225
6,363,139 B1 * 3/2002 Zurek et al. ............... 379/56.1
6,366,863 B1 * 4/2002 Bye et al. ...................... 702/57
6,438,245 B1 * 8/2002 Taenzer et al. ............. 381/330

FOREIGN PATENT DOCUMENTS

DE 196 00 234 A1 10/1997

OTHER PUBLICATIONS

US 2002/0044669 A1, Apr. 18, 2002, Meyer et al., Method of Operating a Hearing Aid.*
US 2002/0068986 A1, Jun. 6, 2002, Mouline, Adaption of Audio and Data Files Based on Personal Hearing Profiles.*
US 2002/0106096 A1, Aug. 8, 2002, Vonlanthen, Behind the Ear Hearing Aid.*

* cited by examiner

*Primary Examiner*—Ramesh Patel
(74) *Attorney, Agent, or Firm*—Schiff Hardin & Waite

(57) ABSTRACT

The method for configuring the functional properties of an audiological device in the form of a hearing aid initially provides a hearing aid with an IC that can be differently configured in view of its properties, permitting configuration upgrade information to be employed that is either distributed to middlemen via a separate data carrier or transmitted on-line from a data store of the manufacturer to a programming station of the middleman. The middleman has the possibility of himself upgrading hearing aids initially present as basic hearing aids in customized fashion, the configuration information being used for this purpose and the hearing manufacturer being paid for this.

12 Claims, 1 Drawing Sheet

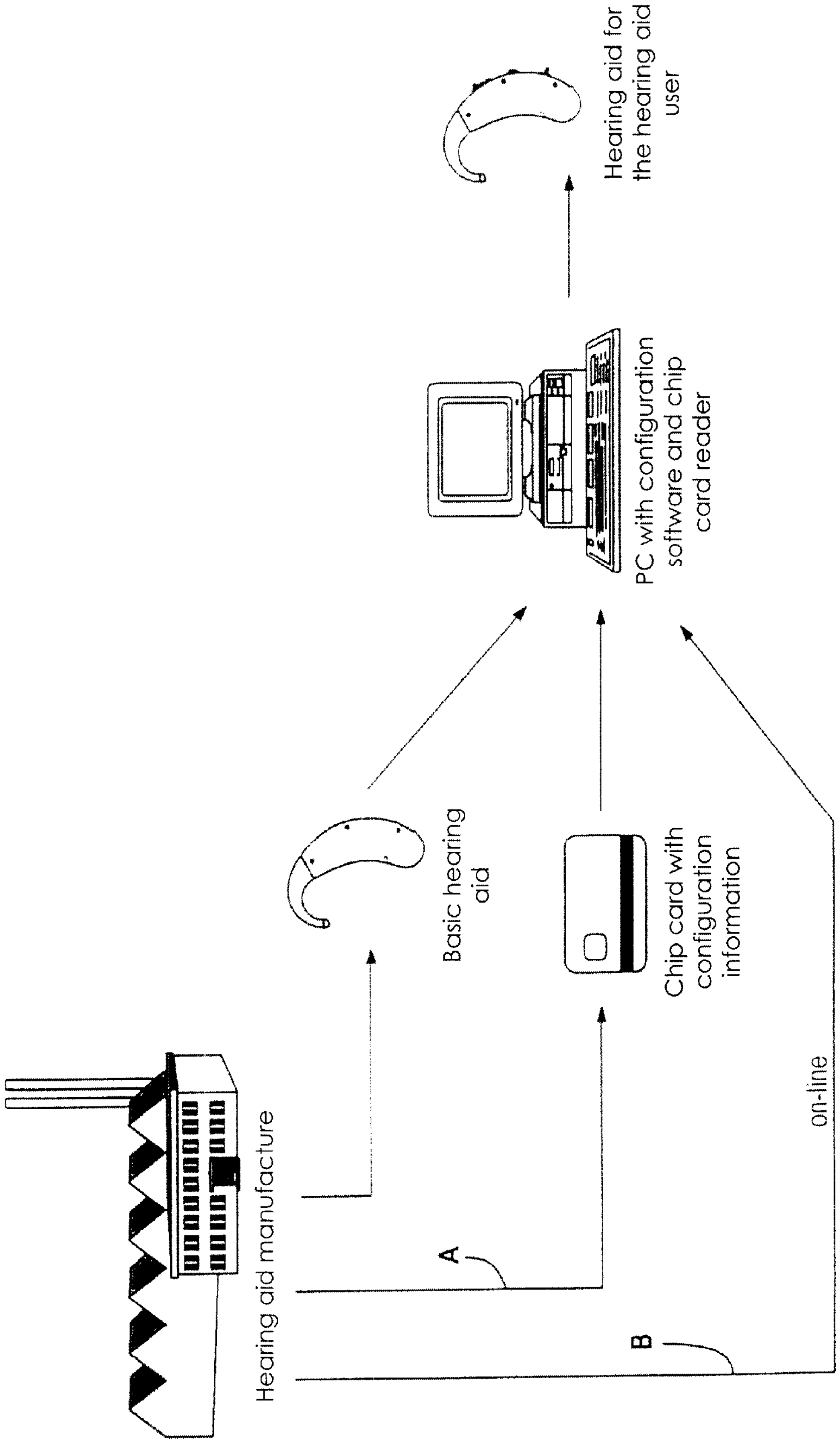
Hearing aid for the hearing aid user
PC with configuration software and chip card reader
Basic hearing aid
Chip card with configuration information
on-line
Hearing aid manufacture
A
B

METHOD FOR CONFIGURING THE FUNCTIONAL PROPERTIES OF AN AUDIOLOGICAL DEVICE

FIELD OF THE INVENTION

The invention is directed to a method for configuring the functional properties of an audiological device, particularly an electronic hearing aid.

DESCRIPTION OF THE RELATED ART

Certain types of hearing aids have critical functional properties that are influenced by an IC. Different ICs permit varying functions to be implemented, including selecting different channels, implementing various function programs, influencing the directional properties of the microphone employed, and selecting the type of noise suppression or similar functions.

The hearing aid type, which is sold as a final product to the consumer, i.e., the hearing aid user, ultimately depends on the programming, i.e., on the configuration of the IC employed. Depending on the equipment, i.e., depending on the enabling of functional properties fundamentally provided in the IC, the same hearing aid can basically be distributed either as a basic version or as a very extravagantly implemented high-end product.

In the manufacture of a prior art hearing aid, a hearing aid is first manufactured and subsequently configured at the factory, at which status information about manufacturer and hearing aid type are programmed into the IC of the hearing aid. This defines what externally visible or audible functional properties of the IC are made available. The completely configured hearing aids are subsequently distributed to the hearing aid acoustician, wholesaler and the like.

This approach has disadvantageous results in that a considerable administrative expenditure is required for each different hearing aid type, particularly in view of the identification of the hearing aid, warehousing the various hearing aids, order processing and the like. For a steady increase of different hearing aid types, this leads to a substantial increase in the logistical outlay.

Moreover, the hearing aid acoustician is not in the position to provide traditional hearing aids with additional properties that are retro-fitted from a basic device to a higher-end device. Given increasing demands on the part of the consumer, the hearing aid acoustician always had to order a new hearing aid of a different type from the manufacturer.

SUMMARY OF THE INVENTION

The invention is based on the object of specifying a method with which audiological devices, particularly hearing aids, can be adapted in a simple way to the requirements of the user and with which organizational distribution outlay can be reduced.

This object is achieved by a method for configuring the functional properties of an audiological device, comprising the steps of:

a) providing the audiological device with an IC that can be differently configured in view of functional properties of the IC;

b) providing a configuration upgrading information in a suitable data store;

c) initially configuring the IC at a manufacturing facility such that the audiological device comprises minimal possible properties in a basic version, and distributing the basic version of the device at a basic price to a middleman or dealer;

d) obtaining upgrade information by either: 1) loading configuration upgrading information onto a separate data carrier at the manufacturing facility and distributing the loaded data carrier, to a middleman or dealer, at a price that is dependent on a type and number of configuration upgrading information packages contained on the data carrier for use on a programming station located at the middleman or dealer, or 2) transmitting configuration upgrading information in an online operation from a software memory of a manufacturer at the manufacturing facility, to a buffer memory of a programming station located at the middleman or dealer;

e) introducing the IC into the programming station and at least partially reading-in the configuration upgrading information from the separate data carrier or the online operation, into the programming station for programming and upgrading the IC to a customized, higher function level; and f) distributing and billing customers for an audiological device upgraded in this manner such that the billing reflects additional functional properties over the basic version.

Further developments include providing a plurality of identical packages of configuration upgrading information that are stored on the separate data carrier. Each configuration upgrading information may comprise a plurality of individually retrievable configuration programs, and the upgrading configuration of different audiological devices may be implemented via a single separate data carrier. The method implemented may also comprise the step of separately reading out and displaying content of remaining configuration upgrading information on the separate data carrier, following a first use of the separate data carrier for upgrading an audiological device, and may display a guideline price information for each configuration upgrading information packet. Configuration upgrading information may be transferred from the IC onto the separate data carrier in the programming station. The inventive method may also provide auxiliary information on the separate data carrier, wherein the auxiliary information may comprise how many audiological basic devices of one type or of a plurality of different types can be reconfigured in devices with upgraded functional properties. A step of reloading the separate data carrier via configuration upgrading information packets a manufacturer makes available on-line may be provided, as well as provisions for copy protection for configuration upgrading information software. Encryption may be utilized on the configuration upgrading information on the separate data carrier. The inventive method may also further comprise the step of reading-in and storing a readout information on the data carrier such that the software package read out from the data carrier or a part of the entire the software cannot be read again from the separate data carrier and read into the IC.

What is important to the method is that a separate data carrier is provided in parallel to the audiological device. This data carrier may contain configuration upgrading information as well as, if required, accompanying software (such as help instructions and the like).

The audiological device comprises an IC that can be differently programmed in view of its functional properties. At the factory, the audiological device is equipped as a basic version, i.e., the IC is programmed such that the device exhibits only minimal properties. Such a device can be distributed at a basic price by the dealer.

The dealer, who now possesses this basic hearing aid and the data carrier, can introduce the data carrier, particularly a chip card, into a corresponding reader and can plug the IC into a programming station connected to the reader. In a simple way, the dealer has the possibility of programming the hearing aid IC (which was initially programmed only in a basic version manner) in a more complex way in order, for example, to configure a high-end hearing aid from a basic or "low-end" device.

This can advantageously take place in a customized manner. The audiological device does not have to be returned to the manufacturer for upgrading; on the contrary, the device can be adapted to the customer demands during direct contact between customer and the audiological expert servicing him.

Inventively, a readout information is then loaded onto the data carrier in order to fix/retain what software was already read from the data carrier and programmed into a hearing aid on the data carrier. The data carrier can be equipped with a plurality of program packages, and the price of the data carrier may also depend on the plurality of these program packages.

The dealer then has the possibility of upgrading a plurality of identical ICs with the assistance of the configuration upgrading information packages or of upgrading only ICs of a device type from a low level to an especially high level.

Every readout of information from the data carrier consumes a portion of the price/cost. When all of the information has been downloaded from the data carrier (or at least as many software packages have been downloaded) to consume the purchase price of the chip card, the dealer must purchase a new data carrier or, respectively, a new chip card in order to upgrade further basic hearing aids.

After every successful configuration event, the information on the data carrier is modified such that the plurality of allowed configuration procedures for a hearing aid type is reduced.

The invention also considers that a plurality of identical packets of configuration information are stored on the data carrier, which permits identical update steps to be implemented at different hearing aids. However, it is also conceivable that a plurality of different program versions are contained on a chip card or a data carrier, so that the user of the chip card has the possibility of selecting between different update versions. All program versions thus need not necessarily be downloaded from the chip card when this is used, regarding its price.

The remaining information that is still available can be read from the card and be separately displayed, permitting guideline price information to be displayed for every configuration software package that is still available.

Configuration upgrade software or sections thereof may also be transmitted back from an IC of a hearing aid onto the data carrier in the programming station. This would be done, however, only when it can be assured that corresponding software and functions enabled with it are no longer available in the IC of the hearing aid. This permits incorrect programming to be voided out, and also permits financially voiding software and functions.

An alternative embodiment permits the data carrier to be reloaded with configuration software packages made available on line by the manufacturer. The dealer can also undertake the upgrading of the IC in the PC-operated programming station without a separate data carrier, i.e., without a chip card. He has the possibility of reading configuration upgrade software into the data carrier directly from the manufacturer in an online operation.

BRIEF DESCRIPTION OF THE DRAWINGS

The single FIGURE is a pictorial diagram of the invention showing the flow of information from the manufacturer into the hearing aid.

DESCRIPTION OF THE PREFERRED EMBODIMENTS

Two versions of the method are shown in the FIGURE of the drawing. The first version provides that hearing aids are fabricated in a factory and are equipped as a basic version, and these basic hearing aids are distributed to hearing aid acousticians, customers or wholesalers who have a PC with configuration upgrading software.

Configuration upgrading software is required in order to upgrade the basic hearing aid at the PC. According to alternative A, the software is capable of being stored on a chip card that the dealer can commercially acquire from the manufacturer. According to alternative B, it is also possible that the software can be directly called from a data bank by online operation and can be read into the PC of the dealer in order to upgrade the basic device at the PC.

The billing for configuration upgrading software packages downloaded by online data transmission can occur in any known manner way.

The above-described method is illustrative of the principles of the present invention. Numerous modifications and adaptations thereof will be readily apparent to those skilled in this art without departing from the spirit and scope of the present invention.

What is claimed is:

1. A method for configuring the functional properties of an audiological device and distributing these configured devices, comprising the steps of:

a) providing said audiological device with an IC that can be differently configured in view of functional properties of said IC;

b) providing a configuration upgrading information in a suitable data store;

c) initially configuring said IC at a manufacturing facility, resulting in said audiological device comprising minimal possible properties in a basic version, and distributing said basic version of said device at a basic price to a middleman or dealer;

d) obtaining upgrade information in a manner selected from the group consisting of:

1) loading configuration upgrading information onto a separate data carrier at said manufacturing facility and distributing said loaded data carrier, to a middleman or dealer, at a price that is dependent on a type and number of configuration upgrading information packages contained on said data carrier for use on a programming station located at said middleman or dealer, and 2) transmitting configuration upgrading information in an online operation from a software memory of a manufacturer at said manufacturing facility, to a buffer memory of a programming station located at said middleman or dealer;

e) introducing said IC into said programming station and at least partially reading-in said configuration upgrading information from a source selected from the group consisting of said separate data carrier and said online operation, into said programming station for programming and upgrading said IC to a customized, higher function level; and f) distributing and billing customers for an audiological device upgraded in this manner resulting in said billing reflecting additional functional properties over said basic version.

2. A method according to claim 1, further comprising the step of:

providing a plurality of identical packages of configuration upgrading information that are stored on said separate data carrier.

3. A method according to claim 2, wherein each configuration upgrading information comprises a plurality of individually retrievable configuration programs.

4. A method according to claim 1, wherein upgrading configuration of different audiological devices are implemented via a single separate data carrier.

5. A method according to claim 1, further comprising the step of:

separately reading out and displaying content of remaining configuration upgrading information on said separate data carrier, following a first use of said separate data carrier for upgrading an audiological device.

6. A method according to claim 1, further comprising the step of:

displaying a guideline price information for each configuration upgrading information packet.

7. A method according to claim 1, further comprising the step of:

transferring said configuration upgrading information from said IC onto said separate data carrier in said programming station.

8. A method according to claim 1, further comprising the step of:

providing auxiliary information on said separate data carrier, wherein said auxiliary information comprises how many audiological basic devices of one type or of a plurality of different types can be reconfigured in devices with upgraded functional properties.

9. A method according to claim 1, further comprising the step of:

reloading said separate data carrier via configuration upgrading information packets a manufacturer makes available on-line.

10. A method according to claim 1, further comprising the step of:

providing copy protection for configuration upgrading information software.

11. A method according to claim 1, further comprising the step of:

encrypting said configuration upgrading information on said separate data carrier.

12. A method according to claim 1, further comprising he step of reading-in and storing a readout information on said data carrier in a manner that said software package read out from said data carrier or a part of the entire said software cannot be read again from said separate data carrier and read into said IC.

* * * * *